(12) United States Patent
Jean et al.

(10) Patent No.: US 12,372,214 B1
(45) Date of Patent: Jul. 29, 2025

(54) MARINE SEARCHLIGHT SYSTEM WITH WIRETAPPING REMOTE CONTROLLERS

(71) Applicant: Wen-Fong Jean, Taoyuan (TW)

(72) Inventors: Wen-Fong Jean, Taoyuan (TW); Da-Zen Jean, Taoyuan (TW); Han-Wen Cheng, New Taipei (TW); Sen-Hung Chen, Taoyuan (TW)

(73) Assignee: Wen-Fong Jean, Taoyuan (TW)

( * ) Notice: Subject to any disclaimer, the term of this patent is extended or adjusted under 35 U.S.C. 154(b) by 0 days.

(21) Appl. No.: 18/932,226

(22) Filed: Oct. 30, 2024

(30) Foreign Application Priority Data

Jan. 26, 2024 (TW) .................. 113103049

(51) Int. Cl.
  *F21S 8/00* (2006.01)
  *B60Q 1/24* (2006.01)
  (Continued)

(52) U.S. Cl.
  CPC .............. *F21S 8/003* (2013.01); *F21S 8/03* (2013.01); *F21S 8/081* (2013.01); *F21V 21/15* (2013.01);
  (Continued)

(58) Field of Classification Search
  CPC . F21W 2107/20; F21V 23/0435; F21V 23/06; F21V 21/14; F21V 21/145; F21V 21/15; F21V 21/26; F21V 21/28; F21V 21/29; F21V 21/30; B63B 45/00; B63B 45/02; B63B 45/04; B63B 45/06; B63B 45/08; B63B 2045/005; B60Q 1/245; H05B 47/185; H05B 47/187; H05B 47/18; H05B 47/183; H05B 47/184; H05B 47/175
See application file for complete search history.

(56) References Cited

U.S. PATENT DOCUMENTS 6,331,756 B1 * 12/2001 Belliveau ............... H05B 47/18
                                                                362/85
12,163,635 B1 * 12/2024 Thompson .......... F21V 23/0435
(Continued)

FOREIGN PATENT DOCUMENTS

CN         105698069 A     6/2016
TW         201611660 A     3/2016

*Primary Examiner* — Colin J Cattanach
(74) *Attorney, Agent, or Firm* — KIRTON McCONKIE; Evan R. Witt

(57) ABSTRACT

The disclosure relates to a marine searchlight system with wiretapping remote controllers including a main body assembly, a wiretapping box and two remote controllers. The main body assembly includes a control motherboard configured to control a lighting module and a driving module. The control motherboard includes a DC power module and a signal receiving module. The DC power module provides a DC power. The signal receiving module receives a control signal. The wiretapping box is electrically connected to the DC power module and the signal receiving module. The two remote controllers are electrically connected to the control motherboard through the wiretapping box. The DC power module provides the DC power to two remote controllers respectively. Each of the two remote controllers allows to transmit the control signal to the signal receiving module through the wiretapping box, so that the control motherboard can control the lighting module and the driving module.

14 Claims, 5 Drawing Sheets

(51) Int. Cl.
*B63B 45/00* (2006.01)
*B63B 45/02* (2006.01)
*B63B 45/06* (2006.01)
*B63B 45/08* (2006.01)
*F21S 8/08* (2006.01)
*F21V 21/14* (2006.01)
*F21V 21/15* (2006.01)
*F21V 21/26* (2006.01)
*F21V 21/28* (2006.01)
*F21V 21/29* (2006.01)
*F21V 21/30* (2006.01)
*F21V 23/00* (2015.01)
*F21V 23/04* (2006.01)
*F21V 23/06* (2006.01)
*F21W 107/20* (2018.01)
*H05B 47/175* (2020.01)
*H05B 47/18* (2020.01)
*H05B 47/185* (2020.01)
*B63B 45/04* (2006.01)

(52) U.S. Cl.
CPC ............ *F21V 21/28* (2013.01); *F21V 23/003* (2013.01); *B60Q 1/245* (2013.01); *B63B 45/00* (2013.01); *B63B 2045/005* (2013.01); *B63B 45/02* (2013.01); *B63B 45/04* (2013.01); *B63B 45/06* (2013.01); *B63B 45/08* (2013.01); *F21V 21/14* (2013.01); *F21V 21/145* (2013.01); *F21V 21/26* (2013.01); *F21V 21/29* (2013.01); *F21V 21/30* (2013.01); *F21V 23/0435* (2013.01); *F21V 23/06* (2013.01); *F21W 2107/20* (2018.01); *H05B 47/175* (2020.01); *H05B 47/18* (2020.01); *H05B 47/183* (2024.01); *H05B 47/184* (2024.01); *H05B 47/185* (2020.01); *H05B 47/187* (2024.01)

(56) References Cited

U.S. PATENT DOCUMENTS

| | | | |
|---|---|---|---|
| 2007/0041194 A1* | 2/2007 | Chiu | B60Q 1/245 362/267 |
| 2010/0259945 A1* | 10/2010 | Chiu | F21V 21/15 341/176 |
| 2012/0120673 A1* | 5/2012 | Anderson | F21S 41/675 429/100 |
| 2013/0093351 A1* | 4/2013 | Chiu | H05B 47/19 315/291 |
| 2016/0341407 A1* | 11/2016 | Manfred | F21V 21/0965 |

* cited by examiner

MARINE SEARCHLIGHT SYSTEM WITH WIRETAPPING REMOTE CONTROLLERS

CROSS-REFERENCE TO RELATED APPLICATION

This application claims priority to Taiwan Patent Application No. 113103049, filed on Jan. 26, 2024. The entireties of the above-mentioned patent application are incorporated herein by reference for all purposes.

FIELD OF THE INVENTION

The present disclosure relates to a marine searchlight system, and more particularly to a marine searchlight system with wiretapping remote controllers, which is facilitated to install, set up and repair, and easy to expand and tap.

BACKGROUND OF THE INVENTION

Ships need searchlights for lighting when sailing, loading and unloading at night. Furthermore, searchlights are used for light language communication with other ships. Therefore, the searchlights can be regarded as an extremely important equipment on the ship. However, most of the existing searchlights for ships are directly fixed on the deck of the ship, and the remote controller is used to adjust the direction of the searchlight, so that the light is focused on a fixed location or corner.

In the existing technology, the marine searchlights can be controlled through wired remote controllers or wireless remote controllers. Compared with the wireless remote controllers whose signal transmission is limited, the control signals transmitted by the wired remote controllers through lines are more stable and sensitive. However, all of the marine searchlights and the wired remote controllers need to be set at fixed locations on the ships and then connected through physical lines. There is a higher line installation cost, and it is less convenient to adjust or change the settings. Once the wired remote controller or the connecting line fails, the entire connecting lines must be replaced.

On the other hand, since the marine searchlight and the wired remote controller need to be installed at fixed positions on the ship, the user can only operate the marine searchlight at the location of the remote controller, so that the flexibility of its operating position is poor. Moreover, the conventional marine searchlights are equipped with one single remote controller when leaving the factory merely. If the circuit of the remote controller fails, the entire set of connecting circuits must be checked, and the number of remote controllers cannot be expanded.

Therefore, it is necessary to provide a marine searchlight system with wiretapping remote controllers, which is facilitated to install, set up and repair, and easy to expand and tap, so as to effectively solve the foregoing problems and overcome the above drawbacks.

SUMMARY OF THE INVENTION

An object of the present disclosure is to provide a marine searchlight system with wiretapping remote controllers, which is facilitated to install, set up and repair, and easy to expand and tap. The main body assembly including the lighting module and the driving module and at least two remote controllers are connected through a wiretapping box of a telephone line. The installation is simple, and it is easy to adjust the corresponding position or perform partial maintenance. Furthermore, the DC power and the control signals are transmitted stably through the telephone line, and the main body assembly can be used to tap a plurality of remote controllers. Each remote controller can receive 5V DC power from the main body assembly. Furthermore, the main body assembly can use, for example, RS485 telecommunications signals to confirm the control priority of the plurality of remote controllers, so that the application stability and the flexibility are excellent.

Another object of the present disclosure is to provide a marine searchlight system with wiretapping remote controllers. The connections between the individual components are extended through the telephone line and expanded through the wiretapping box. The DC power provided by the DC power module in the main body assembly is supplied to each remote controller through the telephone line. Moreover, the control signals generated by each remote controller are allowed to be received by the signal receiving module in the main body assembly through the telephone line. RS485 is a standard for the electrical characteristics of drivers and receivers in serial communication systems. The control motherboard of the main body assembly allows determining which one of the plurality of remote controllers has the control priority through RS485 telecommunication signals, for example. In addition to being easy to replace, using telephone lines to transmit the DC power and the control signals is more stable. The RS485 telecommunications signal generated by the remote controller through the rocker or switch is allowed to be transmitted through the telephone line and confirmed by the control motherboard. Thereby, the driving module with at least two degrees of freedom is controlled to drive the lighting module to rotate horizontally and vertically relative to the base, and the irradiation angle of the irradiation light source is modulated. On the other hand, the control motherboard, the wiretapping box and each remote controller includes the identical RJ11 sockets for a plug-in connection with the RJ11 connector of the telephone line. It results in low installation costs and high flexibility in position adjustment. By replacing some telephone lines, it allows for quick identification of faulty components. The broken telephone lines can also be replaced directly. Certainly, the number of the remote controllers expended through the wiretapping box is adjustable according to the practical requirements, so as to increase the control flexibility of the marine searchlight system.

According to an aspect of the present disclosure, a marine searchlight system with wiretapping remote controllers is provided. The marine searchlight system includes a main body assembly, at least one wiretapping box and at least two remote controllers. The main body assembly include a base, a lighting module, a driving module and a control motherboard. The base is configured to fix to a ship hull. The lighting module is configured to provide an irradiation light source. The driving module is disposed between the base and the lighting module and configured to drive the lighting module to modulate an irradiation angle of the irradiation light source. The control motherboard is received in the base, electrically connected to the lighting module and the driving module, and configured to control the driving module and the lighting module, wherein the control motherboard further includes a DC power module and a signal receiving module, the DC power module provides a DC power, and the signal receiving module receives a control signal to control the driving module and the lighting module. The at least one wiretapping box is electrically connected to the DC power module and the signal receiving module of the control motherboard. The at least two remote controllers are electrically connected to the control motherboard through the at least one wiretapping box, respectively, wherein the DC power module provides the DC power to the at least two remote controllers, respectively, and each of the at least two remote controllers allows to transmit the control signal to the signal receiving module through the wiretapping box, so that the control motherboard corresponding controls the lighting module and the driving module.

In an embodiment, the wiretapping box includes a one-to-two adaptor with three identical sockets.

In an embodiment, the control motherboard includes a socket that allows the wiretapping box to be connected to the control motherboard through an extended telephone line, and two identical connectors are disposed at two ends of the extended telephone line.

In an embodiment, the three identical sockets and the socket of the control motherboard are RJ11 sockets, and the identical connectors are RJ11 connectors.

In an embodiment, each of the at least two remote controllers includes a socket that allows the wiretapping box to be connected thereto through an extended telephone line, and two identical connectors are disposed at two ends of the extended telephone line.

In an embodiment, the three identical sockets and the sockets of the at least two remote controllers are RJ11 sockets, and the identical connectors are RJ11 connectors.

In an embodiment, the DC power is a 5 V DC power.

In an embodiment, the control signal includes a telecommunication signal, and the control motherboard determines which of the at least two remote controllers has a control priority in accordance with the telecommunication signal.

In an embodiment, the telecommunication signal is a RS485 telecommunication signal.

In an embodiment, the lighting module is disposed on a housing, and the driving module includes a first driving element, a bracket component and a second driving element, wherein the first driving element is disposed between the base and a bottom end of the bracket component, and configured to drive the bracket component to rotate horizontally relative to the base, wherein the second driving element is disposed between a top end of the bracket component and the housing, and configured to drive the housing to rotate up and down relative to the bracket component.

In an embodiment, each of the at least two remote controllers includes a rocker and a microcontroller circuit board, which are configured to generate the control signal to control operations of the first driving element or/and the second driving element, so that the lighting module and the housing are rotated horizontally or/and vertically relative to the base, and the irradiation angle of the irradiation light source is modulated.

In an embodiment, each of the at least two remote controllers includes a power switch configured to generate the control signal to control the lighting module to turn on or turn off the irradiation light source.

In an embodiment, each of the at least two remote controllers includes a speed switch configured to generate the control signal to control rotational speeds of the lighting module and the housing driven by the first driving element and the second driving element relative to the base.

In an embodiment, the wiretapping box includes a one-to-two adaptor, a one-to-four adaptor or a one-to-multiple adaptor.

The above objects and advantages of the present disclosure become more readily apparent to those ordinarily skilled in the art after reviewing the following detailed description and accompanying drawings, in which:

DETAILED DESCRIPTION OF THE PREFERRED EMBODIMENT

Figure 1:
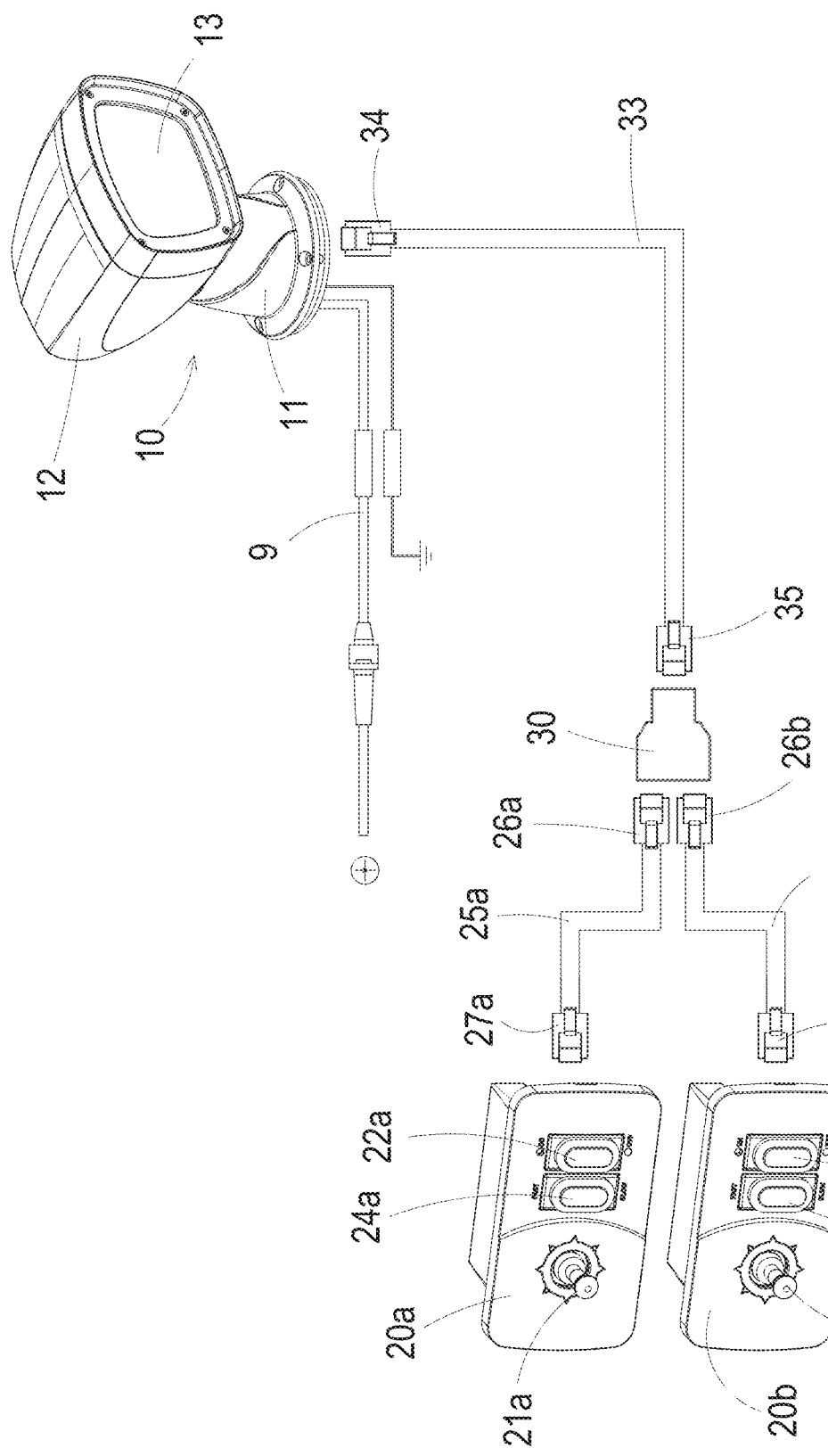
FIG. 1 is a schematic structural diagram showing a marine searchlight system with wiretapping remote controllers to an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "upper," "lower," "top," "bottom," "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments.

Figure 2:
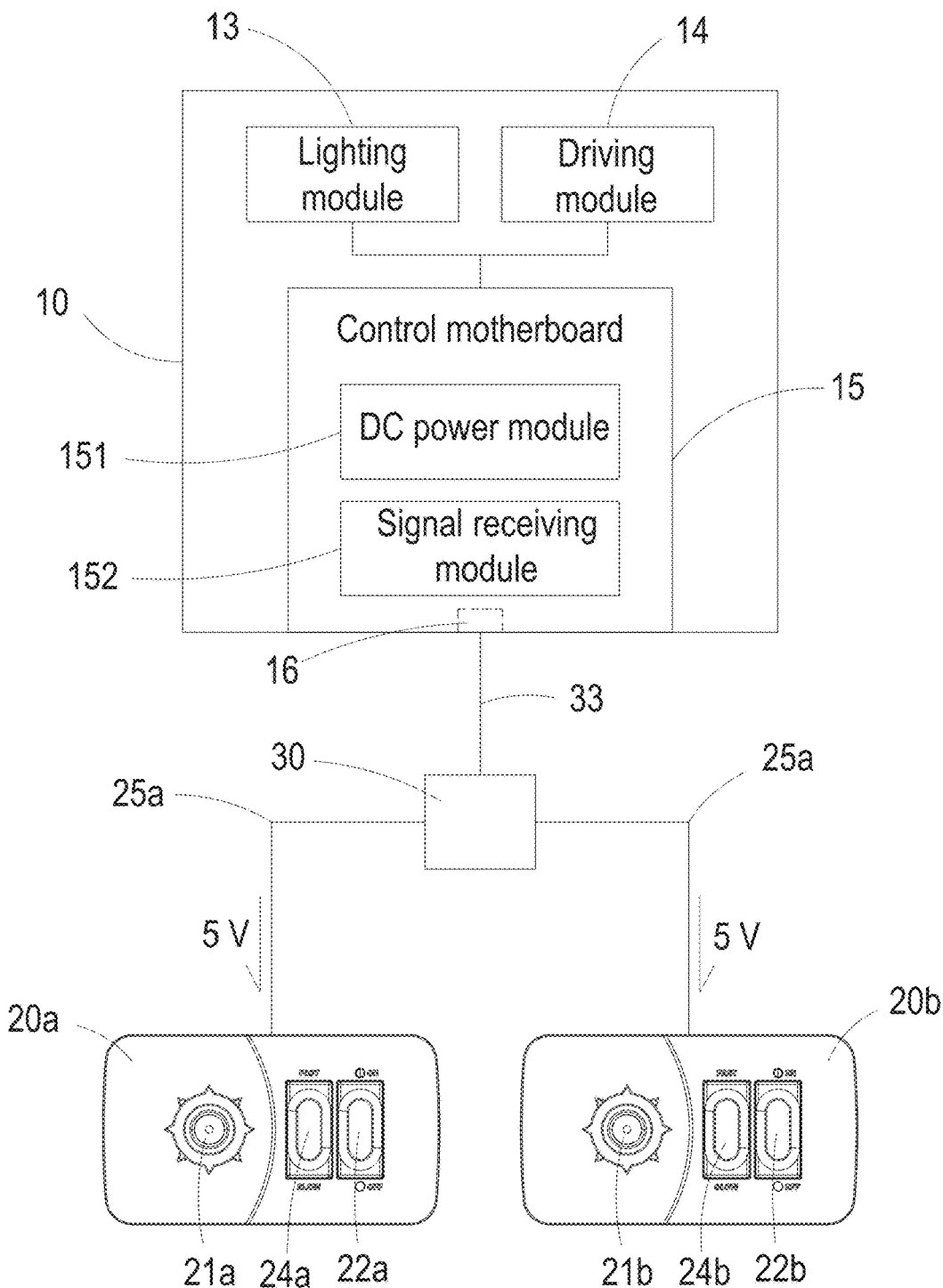
FIG. 2 is a functional block diagram showing the marine searchlight system with wiretapping remote controllers according to the embodiment of the present disclosure.
Figure 3:
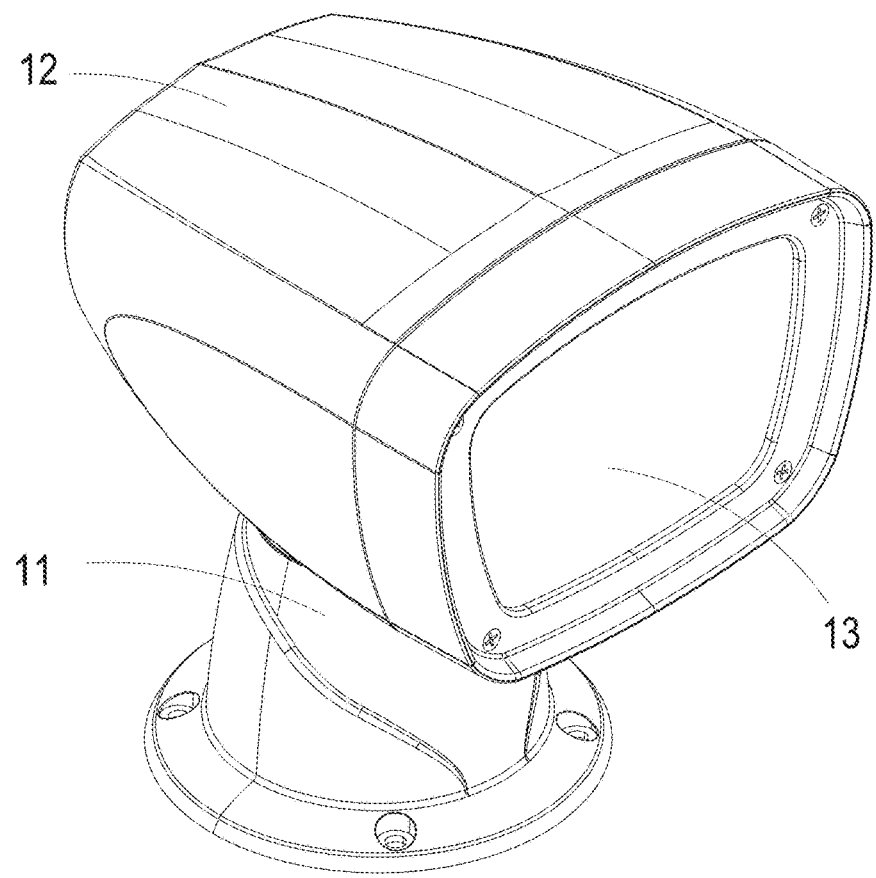
FIG. 3 is a perspective view illustrating the main body assembly of the marine searchlight system with wiretapping remote controllers according to the embodiment of the present disclosure.
Figure 4:
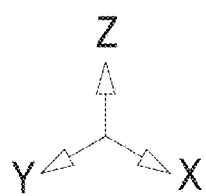
FIG. 4 is a cross-sectional view illustrating the main body assembly of the marine searchlight system with wiretapping remote controllers according to the embodiment of the present disclosure.
Figure 4:
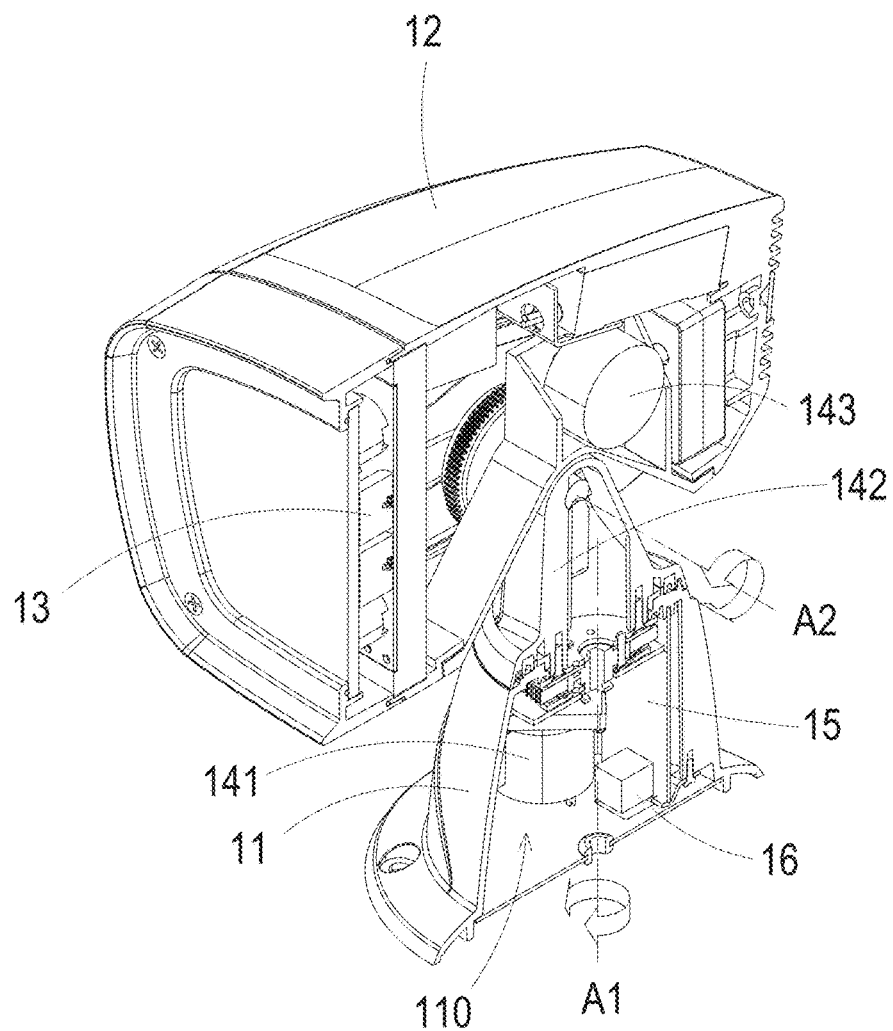
Figure 5:
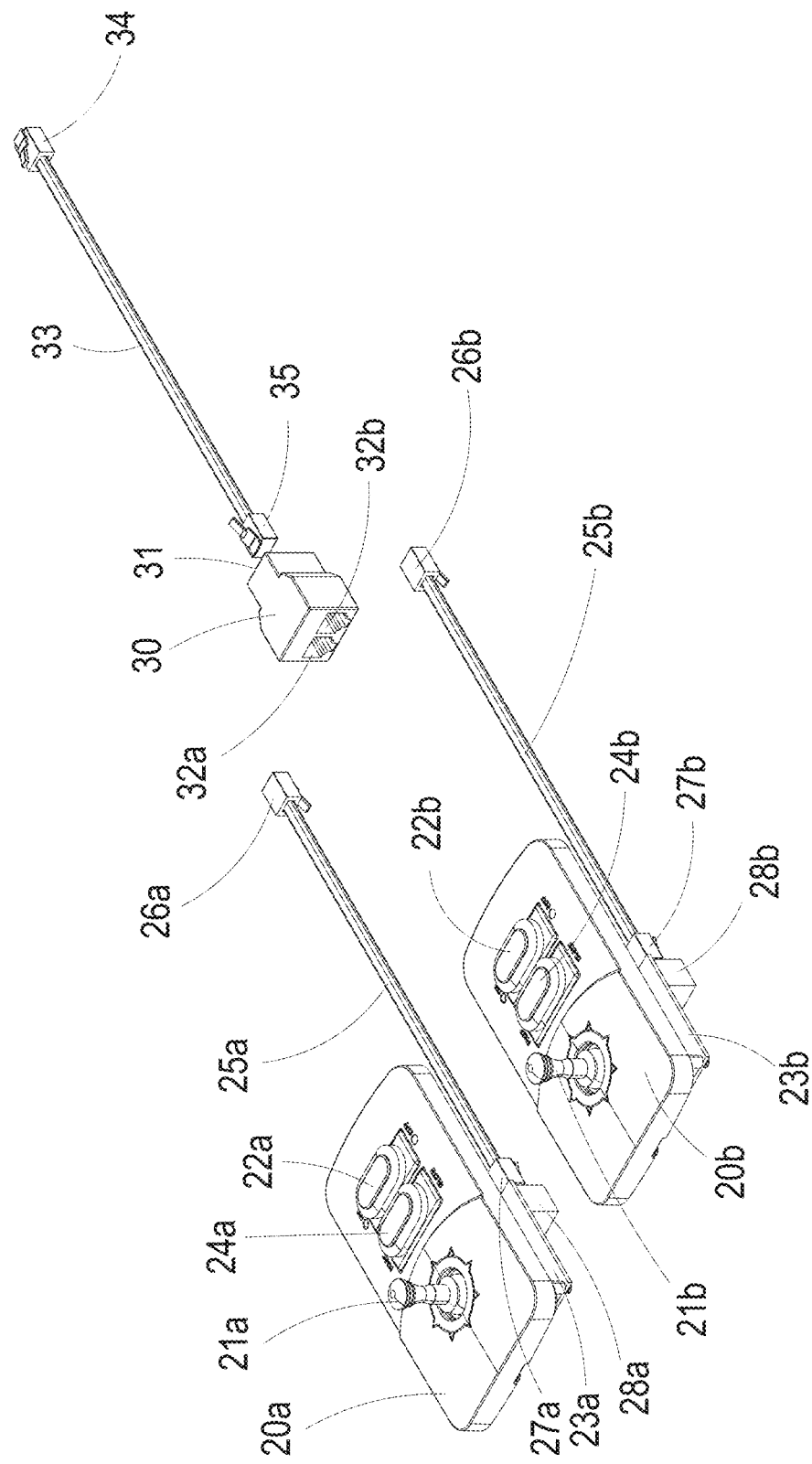
FIG. 5 is a schematic diagram showing the remote controller connected to the wiretapping box through the telephone lines in the marine searchlight system of the present disclosure.

FIG. 1 is a schematic structural diagram showing a marine searchlight system with wiretapping remote controllers to an embodiment of the present disclosure. FIG. 2 is a functional block diagram showing the marine searchlight system with wiretapping remote controllers according to the embodiment of the present disclosure. FIG. 3 is a perspective view illustrating the main body assembly of the marine searchlight system with wiretapping remote controllers according to the embodiment of the present disclosure. FIG. 4 is a cross-sectional view illustrating the main body assembly of the marine searchlight system with wiretapping remote controllers according to the embodiment of the present disclosure. FIG. 5 is a schematic diagram showing the remote controller connected to the wiretapping box through the telephone lines in the marine searchlight system of the present disclosure. In the embodiment, the present disclosure provides a marine searchlight system 1 for wiretapping remote controllers. The marine searchlight system 1 includes a main body assembly 10, at least one wiretapping box 30 and at least two remote controllers 20a, 20b. The main body assembly 10 include a base 11, a lighting module 13, a driving module 14 and a control motherboard 15. The base 10 is configured to fix to high on the front edge of a ship hull (not shown). The lighting module 13 is configured to provide an irradiation light source. Preferably but not exclusively, in the embodiment, the lighting module 13 is an LED lighting module, a halogen lighting module or a high-intensity discharge (HID) lighting module. The driving module 14 is disposed between the base 11 and the lighting module 13 and configured to drive the lighting module 13 to modulate an irradiation angle of the irradiation light source. The control motherboard 15 is received in an accommodation space 110 the base 11, electrically connected to the lighting module 13 and the driving module 14, and configured to control the driving module 14 and the lighting module 13. In the embodiment, the control motherboard 15 further includes a DC power module 151 and a signal receiving module 152. The DC power module 151 provides a DC power, and the signal receiving module 152 receives a control signal to control the driving module 14 and the lighting module 13. The at least one wiretapping box 30 is electrically connected to the DC power module 151 and the signal receiving module 152 of the control motherboard 15. The at least two remote controllers 20a, 20b are electrically connected to the control motherboard 15 through the at least one wiretapping box 30, respectively. In the embodiment, the DC power module 151 provides the DC power to the at least two remote controllers 20a, 20b, respectively, and each of the at least two remote controllers 20a, 20b allows to transmit the control signal to the signal receiving module 152 through the wiretapping box 30, so that the control motherboard 15 corresponding controls the lighting module 13 and the driving module 14. In this way, the main body assembly 10 including the lighting module 13 and the driving module 14 can be connected to the at least two remote controllers 20a, 20b are connected through the wiretapping box 30 easily. The installation is simple, and it is easy to adjust the corresponding position or perform partial maintenance, and easy to expand and tap at the same time.

Please refer to FIG. 2 to FIG. 4. In the embodiment, the structure of the main body assembly 10 mainly includes the base 11, the driving module 14 and the lighting module 13 disposed on a housing 12. Preferably but not exclusively, the base 11 and the housing 12 are made of aluminum alloy. Preferably but not exclusively, in the embodiment, the base 11 is further fixed to the high front edge of the ship hull through a waterproof gasket, so that the lighting module 13 disposed on the housing 12 faces forward. Certainly, the present disclosure is not limited thereto. In the embodiment, the driving module 14 includes a first driving element 141, a bracket component 142 and a second driving element 143. The first driving element 141 is composed of a motor and a gear set, disposed between the base 11 and a bottom end of the bracket component, and configured to drive the bracket component 142 to rotate horizontally relative to the base 11 with the axis A1 as the center. In addition, the lighting module 13 is disposed on the housing 12. Preferably but not exclusively, the second driving element is also composed of a motor and a gear set, disposed between a top end of the bracket component 142 and the housing 12, and configured to drive the housing 12 (including the lighting module 13) to rotate up and down relative to the bracket component 142 with the axis A2 as the center. Certainly, the way in which the driving module 14 drives the lighting module 13 to modulate the irradiation angle of the irradiation light source is adjustable according to the practical requirements, and the present disclosure is not limited thereto.

Please refer to FIG. 1 to FIG. 5. In the embodiment, the remote controllers 20a, 20b have the same structure. Preferably but not exclusively, the remote controller 20a includes a rocker 21a and a microcontroller circuit board 23a, which are configured to generate the control signal to control operations of the first driving element 141 or/and the second driving element 143, so that the lighting module 13 and the housing 12 (including the lighting module 13) are rotated horizontally or/and vertically relative to the base 11, and the irradiation angle of the irradiation light source is modulated. Similarly, the remote controller 20b includes a rocker 21b and a microcontroller circuit board 23b, which are configured to generate the control signal to control operations of the first driving element 141 or/and the second driving element 143, so that the lighting module 13 and the housing 12 (including the lighting module 13) are rotated horizontally or/and vertically relative to the base 11, and the irradiation angle of the irradiation light source is modulated. In the embodiment, the remote controller 20a includes a power switch 22a configured to generate the control signal to control the lighting module 13 to turn on or turn off the irradiation light source. Similarly, the remote controller 20b includes a power switch 22b configured to generate the control signal to control the lighting module 13 to turn on or turn off the irradiation light source. In the embodiment, the remote controller 20a includes a speed switch 24a configured to generate the control signal to control rotational speeds of the lighting module 13 and the housing 12 driven by the first driving element 141 and the second driving element 143 relative to the base 11. Similarly, the remote controller 20b includes a speed switch 24b configured to generate the control signal to control rotational speeds of the lighting module 13 and the housing 12 driven by the first driving element 141 and the second driving element 143 relative to the base 11. Certainly, the functions and structures of the remote controllers 20a, 20b are adjustable according to the practical requirements and can have different combinations. The present disclosure is not limited thereto.

Notably, in the embodiment, the wiretapping box 30 includes a one-to-two adaptor with three identical RJ11 sockets 31, 32a, 32b. Corresponding to the RJ11 socket 31 of the wiretapping box 30, the control motherboard 15 in the main body assembly 10 includes an RJ11 socket 16, for example, facing the bottom side of the base 11. It allows the RJ11 socket 31 of the wiretapping box 30 to be connected to the RJ11 socket 16 on the control motherboard 15 through an extended telephone line 33. Preferably but not exclusively, the extended telephone line 33 includes two identical RJ11 connectors 34, 35 disposed at two ends of the extended telephone line 33. Furthermore, in the embodiment, the remote controller 20a includes an RJ11 socket 28a corresponding to the RJ11 socket 32a of the wiretapping box 30. It allows the RJ11 socket 32a of the wiretapping box 30 to be connected to the RJ11 socket 28a of the remote controller 20a through an extended telephone line 25a. Preferably but not exclusively, the extended telephone line 25a includes two identical RJ11 connectors 26a, 27a disposed at two ends of the extended telephone line 25a. Similarly, in the embodiment, the remote controller 20b includes an RJ11 socket 28b corresponding to the RJ11 socket 32b of the wiretapping box 30. It allows the RJ11 socket 32b of the wiretapping box 30 to be connected to the RJ11 socket 28b of the remote controller 20a through an extended telephone line 25b. Preferably but not exclusively, the extended telephone line 25b includes two identical RJ11 connectors 26b, 27b disposed at two ends of the extended telephone line 25b. Notably, the RJ11 sockets 31, 32a, 32b, 16, 28a, 28b have the identical structure, and the RJ11 connectors 34, 35, 26a, 27a, 26b, 27b have the identical structure, so the extended telephone lines 33, 25a, 25b can be used interchangeably, without restriction on wiring direction, and can be designed with different lengths. Thereby, one ordinary user can easily complete the installation of the marine searchlight system 1 with wiretapping remote controller, or perform the simple maintenance, and even expand and wiretap according to the practical requirements. Since the control motherboard 15, the wiretapping box 30 and each remote controller 20a, 20b have the identical RJ11 sockets 31, 32a, 32b, 16, 28a, 28b, it allows the plug-in connection with the identical RJ11 connectors 34, 35, 26a, 27a, 26b, 27b. It results in low installation cost and high flexibility in position adjustment. On the other hand, by replacing some extended telephone lines, it allows for quick identification of faulty components. The broken telephone lines can also be replaced directly. Certainly, the number of the remote controllers 20a, 20b expended through the wiretapping box 30 is adjustable according to the practical requirements, so as to increase the control flexibility of the marine searchlight system. In other embodiments, the adaptor of the wiretapping box 30 is not limited to single to double adaptor. Moreover, the specifications or types of the sockets 31, 32a, 32b, 16, 28a, 28b and the connectors 34, 35, 26a, 27a, 26b, 27b are adjustable according to the practical requirements, and may not be limited to the RJ11 specifications.

Preferably but not exclusively, in the embodiment, the AC power required for the main body assembly 10 is introduced from the bottom plate of the base 11 by an external power cord 9 to supply the AC power to the control motherboard 15. The DC power module 151 on the control mainboard 15 provides the DC power. The DC power is introduced to the remote controller 20a through the extended telephone line 33, the wiretapping box 30 and the extended telephone line 25a, and introduced to the remote controller 20b through the extended telephone line 33, the wiretapping box 30 and the extended telephone line 25b. Preferably but not exclusively, in the embodiment, the DC power is a 5 V DC power. In this way, the DC power provided by the DC power module 151 of the main body assembly 10 is supplied to each remote controller 20a, 20b through the extended telephone lines 33, 25a, 25b. Moreover, the control signals generated by each remote controller 20a, 20b is transmitted through the extended telephone lines 33, 25a, 25b, and received by the signal receiving module 152 of the main body assembly 10.

In the embodiment, the control signal includes a telecommunication signal. Preferably but not exclusively, the telecommunication signal is a RS485 telecommunication signal. RS485 is a standard for the electrical characteristics of drivers and receivers in serial communication systems. The control motherboard 15 of the main body assembly 10 allows determining which one of the two remote controllers 20a, 20b has the control priority through RS485 telecommunication signals, so as to avoid mutual interference. Since the DC power and the control signals can be transmitted through the telephone lines stably, it allows the main body assembly 10 to tap a plurality of remote controllers 20a, 20b. Each remote controller 20a, 20b can obtain the 5V DC power supply from the main body assembly 10. Moreover, the main body assembly 10 can use the RS485 telecommunications signals to confirm the control priorities of the plurality of remote controllers 20a, 20b, so that the application stability and the flexibility are excellent.

From the above, it can be seen that the marine searchlight system 1 with wiretapping remote controllers in the present disclosure is easy to disassemble and replace. Furthermore, transmitting the DC power and the control signals through the extended telephone lines 33, 25a, 25b is more stable. The RS485 telecommunications signal generated by the remote controller 20a, 20b through the rocker 21a, 21b, the power switch 22a, 22b and the speed switch 24a, 24b is allowed to be transmitted through the telephone line and confirmed by the control motherboard 15. Thereby, the driving module 14 with at least two degrees of freedom is controlled to drive the lighting module 13 to rotate horizontally and vertically relative to the base 11, and the irradiation angle of the irradiation light source is modulated.

Notably, the wiretapping box 30 cooperated with the telephone lines for tapping is not limited to one-to two wiretapping. In addition to changing the type of the wiretapping box 30 from one-to-two type to one-to-multiple type, a plurality of one-to-two wiretapping boxes 30 can also be used to realize one-to-multiple wiretapping. For example, the marine searchlight system 1 can be wiretapped in a tree-like manner and expanded in a one-to-two way, or two-to-four way. In other words, the number of remote controllers 20a, 20b expanded through the wiretapping box 30 and the telephone lines can be adjusted according to the practical requirements. The position of each remote controller 20a relative to the main body assembly 10 and the lengths of the telephone lines lead are adjusted and changed arbitrarily, so that the installation simplified and the control flexibility of the marine searchlight system 1 is increased effectively. Certainly, the present disclosure is not limited thereto and not redundantly described herein.

In summary, the present disclosure provides a marine searchlight system with wiretapping remote controllers, which is facilitated to install, set up and repair, and easy to expand and tap. The main body assembly including the lighting module and the driving module and at least two remote controllers are connected through a wiretapping box of a telephone line. The installation is simple, and it is easy to adjust the corresponding position or perform partial maintenance. Furthermore, the DC power and the control signals are transmitted stably through the telephone line, and the main body assembly can be used to tap a plurality of remote controllers. Each remote controller can receive 5V DC power from the main body assembly. Furthermore, the main body assembly can use, for example, RS485 telecommunications signals to confirm the control priority of the plurality of remote controllers, so that the application stability and the flexibility are excellent. The connections between the individual components are extended through the telephone line and expanded through the wiretapping box. The DC power provided by the DC power module in the main body assembly is supplied to each remote controller through the telephone line. Moreover, the control signals generated by each remote controller are allowed to be received by the signal receiving module in the main body assembly through the telephone line. RS485 is a standard for the electrical characteristics of drivers and receivers in serial communication systems. The control motherboard of the main body assembly allows determining which one of the plurality of remote controllers has the control priority through RS485 telecommunication signals, for example. In addition to being easy to replace, using telephone lines to transmit the DC power and the control signals is more stable. The RS485 telecommunications signal generated by the remote controller through the rocker or switch is allowed to be transmitted through the telephone line and confirmed by the control motherboard. Thereby, the driving module with at least two degrees of freedom is controlled to drive the lighting module to rotate horizontally and vertically relative to the base, and the irradiation angle of the irradiation light source is modulated. On the other hand, the control motherboard, the wiretapping box and each remote controller includes the identical RJ11 sockets for a plug-in connection with the RJ11 connector of the telephone line. It results in low installation costs and high flexibility in position adjustment. By replacing some telephone lines, it allows for quick identification of faulty components. The broken telephone lines can also be replaced directly. Certainly, the number of the remote controllers expended through the wiretapping box is adjustable according to the practical requirements, so as to increase the control flexibility of the marine searchlight system.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A marine searchlight system with wiretapping remote controllers comprising:
    a main body assembly comprising:
        a base configured to fix to a ship hull;
        a lighting module configured to provide an irradiation light source;
        a driving module disposed between the base and the lighting module and configured to drive the lighting module to modulate an irradiation angle of the irradiation light source; and
        a control motherboard received in the base, electrically connected to the lighting module and the driving module, and configured to control the driving module and the lighting module, wherein the control motherboard further comprises a DC power module and a signal receiving module, the DC power module provides a DC power, and the signal receiving module receives a control signal to control the driving module and the lighting module;
    at least one wiretapping box electrically connected to the DC power module and the signal receiving module of the control motherboard; and
    at least two remote controllers electrically connected to the control motherboard through the at least one wiretapping box, respectively, wherein the DC power module provides the DC power to the at least two remote controllers, respectively, and each of the at least two remote controllers allows to transmit the control signal to the signal receiving module through the wiretapping box, so that the control motherboard corresponding controls the lighting module and the driving module.

2. The marine searchlight system with wiretapping remote controllers according to claim 1, wherein the wiretapping box comprises a one-to-two adaptor with three identical sockets.

3. The marine searchlight system with wiretapping remote controllers according to claim 2, wherein the control motherboard comprises a socket that allows the wiretapping box to be connected to the control motherboard through an extended telephone line, and two identical connectors are disposed at two ends of the extended telephone line.

4. The marine searchlight system with wiretapping remote controllers according to claim 3, wherein the three identical sockets and the socket of the control motherboard are RJ11 sockets, and the identical connectors are RJ11 connectors.

5. The marine searchlight system with wiretapping remote controllers according to claim 2, wherein each of the at least two remote controllers comprises a socket that allows the wiretapping box to be connected thereto through an extended telephone line, and two identical connectors are disposed at two ends of the extended telephone line.

6. The marine searchlight system with wiretapping remote controllers according to claim 5, wherein the three identical sockets and the sockets of the at least two remote controllers are RJ11 sockets, and the identical connectors are RJ11 connectors.

7. The marine searchlight system with wiretapping remote controllers according to claim 1, wherein the DC power is a 5 V DC power.

8. The marine searchlight system with wiretapping remote controllers according to claim 1, wherein the control signal includes a telecommunication signal, and the control motherboard determines which of the at least two remote controllers has a control priority in accordance with the telecommunication signal.

9. The marine searchlight system with wiretapping remote controllers according to claim 8, wherein the telecommunication signal is a RS485 telecommunication signal.

10. The marine searchlight system with wiretapping remote controllers according to claim 1, wherein the lighting module is disposed on a housing, and the driving module comprises a first driving element, a bracket component and a second driving element, wherein the first driving element is disposed between the base and a bottom end of the bracket component, and configured to drive the bracket component to rotate horizontally relative to the base, wherein the second driving element is disposed between a top end of the bracket component and the housing, and configured to drive the housing to rotate up and down relative to the bracket component.

11. The marine searchlight system with wiretapping remote controllers according to claim 10, wherein each of the at least two remote controllers comprises a rocker and a microcontroller circuit board, which are configured to generate the control signal to control operations of the first driving element or/and the second driving element, so that the lighting module and the housing are rotated horizontally or/and vertically relative to the base, and the irradiation angle of the irradiation light source is modulated.

12. The marine searchlight system with wiretapping remote controllers according to claim 11, wherein each of the at least two remote controllers comprises a power switch configured to generate the control signal to control the lighting module to turn on or turn off the irradiation light source.

13. The marine searchlight system with wiretapping remote controllers according to claim 11, wherein each of the at least two remote controllers comprises a speed switch configured to generate the control signal to control rotational speeds of the lighting module and the housing driven by the first driving element and the second driving element relative to the base.

14. The marine searchlight system with wiretapping remote controllers according to claim 1, wherein the wiretapping box comprises a one-to-two adaptor, a one-to-four adaptor or a one-to-multiple adaptor.

\* \* \* \* \*